US008882202B2

(12) United States Patent
Petzel et al.

(10) Patent No.: US 8,882,202 B2
(45) Date of Patent: Nov. 11, 2014

(54) SEAT CUSHION BODY AND METHOD OF PRODUCING A SEAT CUSHION BODY

(75) Inventors: Jan Petzel, Tübingen (DE); Alenka Fäller, Nürnberg (DE)

(73) Assignee: Schukra Geraetebau GmbH, Berndorf (AT)

( * ) Notice: Subject to any disclaimer, the term of this patent is extended or adjusted under 35 U.S.C. 154(b) by 232 days.

(21) Appl. No.: 13/498,189

(22) PCT Filed: Aug. 9, 2011

(86) PCT No.: PCT/EP2011/003981
§ 371 (c)(1),
(2), (4) Date: Mar. 26, 2012

(87) PCT Pub. No.: WO2012/019752
PCT Pub. Date: Feb. 16, 2012

(65) Prior Publication Data
US 2012/0181841 A1    Jul. 19, 2012

(30) Foreign Application Priority Data

Aug. 10, 2010    (EP) .................................... 10008329

(51) Int. Cl.
*A47C 7/18*    (2006.01)
*A47C 31/11*    (2006.01)
*A47C 31/00*    (2006.01)
*B60N 2/70*    (2006.01)
*C08F 2/00*    (2006.01)

(52) U.S. Cl.
CPC . *C08F 2/00* (2013.01); *A47C 31/11* (2013.01); *A47C 31/006* (2013.01); *B60N 2/7017* (2013.01)
USPC ................................ 297/452.27; 297/452.37

(58) Field of Classification Search
CPC ...... B60N 2/7035; B60N 2/70; B60N 2/5685; B60N 2/2882; A47C 7/18; A47C 27/15; A47C 7/20; A47C 27/148; A47C 27/22; A47C 27/12; Y10S 297/01; Y10S 297/02; Y10S 428/902; Y10S 5/593
USPC ......................................... 297/452.27, 452.37
See application file for complete search history.

(56) References Cited

U.S. PATENT DOCUMENTS 4,837,881 A * 6/1989 Kondo et al. ..................... 5/653
5,843,559 A   12/1998 Cadieux et al.

(Continued)

FOREIGN PATENT DOCUMENTS

| EP | 2002760 | 12/2008 |
| EP | 2008549 | 12/2008 |
| JP | 7059635 | 3/1995 |

OTHER PUBLICATIONS

PCT/EP2011/003981 International Search Report dated Oct. 28, 2011 (4 pages).

(Continued)

*Primary Examiner* — Sarah B McPartlin
(74) *Attorney, Agent, or Firm* — Michael Best & Friedrich LLP

(57) ABSTRACT

A seat cushion body and method of producing the same are provided. In a method of producing a seat cushion body, fiber material is inserted into a mold. Heat is supplied to the fibers to cause thermal activation of binding fibers, so as to effect thermal cross-linking. The resulting seat cushion body includes a resilient portion formed from the fibers and having a fiber orientation along a main load direction of the seat cushion body. The seat cushion body may include at least one further portion formed from the fibers, which has a fiber orientation and/or a density different from the fiber orientation and/or different from a density of the resilient portion. The resilient portion and the at least one further portion may be integrally formed from the cross-linked fiber material as a unitary body.

4 Claims, 4 Drawing Sheets

(56) References Cited

U.S. PATENT DOCUMENTS

| | | | |
|---|---|---|---|
| 6,086,813 A * | 7/2000 | Gruenwald | 264/460 |
| 6,122,806 A * | 9/2000 | Umezawa et al. | 24/598.6 |
| 6,226,819 B1 * | 5/2001 | Ogawa et al. | 5/653 |
| 6,817,674 B2 * | 11/2004 | Fujita et al. | 297/452.48 |
| 2006/0273650 A1 * | 12/2006 | Embach | 297/452.27 |
| 2009/0267401 A1 * | 10/2009 | Ito et al. | 297/452.58 |
| 2011/0068498 A1 * | 3/2011 | Ito et al. | 264/45.3 |

OTHER PUBLICATIONS

PCT/EP2011/003981 International Written Opinion dated Oct. 28, 2011 (8 pages).

\* cited by examiner

SEAT CUSHION BODY AND METHOD OF PRODUCING A SEAT CUSHION BODY

CROSS REFERENCE TO RELATED APPLICATIONS

This application is a U.S. national phase application filing of International Patent Application No. PCT/EP2011/003981, filed Aug. 9, 2011, which claims the benefit of and priority to European Patent Application No. 10008329.4, filed Aug. 10, 2010, the entire contents of each of which are incorporated herein by reference.

The invention relates to a seat cushion body and a method of producing a seat cushion body. The invention relates in particular to a seat cushion body formed from a fiber material and a method of producing a seat cushion body from a fiber material.

Foams, such as polyurethane (PU) foams, are widely used as fabric backings for seats, such as for vehicle interior materials in the transportation industry. The foams are adhered to the backs of textile face materials. These foam backed composites have a cushion effect which can offer comfort or a luxurious feel in contact areas.

There are drawbacks to using polyurethane foam as cushioning material for seats. For example, the polyurethane foam backed material can emit volatile materials which contribute to 'fogging' of vehicle or housing interiors, and the foam itself may oxidize over time leading to a color change in the material. Recyclability is also an issue which has to be addressed.

For these and other reasons, there is a continued need for another material that would provide cushion properties similar to the ones of foam materials at similar costs. One class of materials which has received attention in this regard is nonwovens, for example polyester nonwovens. These materials can provide a suitable backing to many face fabrics. To date, however, in order to obtain cushions of a sufficient thickness, an economically deficient amount of material was required.

Methods of producing mats of perpendicular laid, thermally bonded nonwovens, including air laid and "Struto" nonwoven techniques, have strived to provide a cushion with an economical and weight advantage to previous nonwoven technologies. These techniques orient the staple fibers into a vertical position and allow increased material thickness. However, the fiber material usually has to be heated plural times to produce the sheet, and additional processing is required to form a cushion body having a thickness and cushion properties satisfactory for seating purposes. This adds to the complexity and costs of the produced cushion body. Further, for a cushion body formed by joining plural pre-formed mats produced using the Struto technique, the use of cross-linking fibers in forming the mat may cause problems in downstream processes due to reorientation when the mats are heated in downstream processes such as molding or contouring. Combining a mat produced using the Struto technique with another mat produced using the Struto technique, or with other sheet-like materials, in a stacked structure may also give rise to problems associated with the structural integrity at the interface between different mats or sheets of material. Such stacked structures of joined mats may be prone to water ingress or structural damage at their sides. Layering sheets produced from different materials may frequently be unavoidable to accommodate the different requirements imposed on the surface of the cushion body, which is expected to provide adequate backing for a cover material, as compared to the requirements imposed on other portions of the cushion body which provide resiliency upon exertion of a force along a main load direction.

In view of the above, there is a continued need in the art for a seat cushion body and a method of producing a seat cushion body which address some of the above needs. There is in particular a need in the art for a seat cushion body and method of producing the same which offers weight advantages over existing PU foam cushion bodies, which provides good breathability and ventilation and which attains comfort characteristics comparable to the ones of PU foam cushion bodies. There is also a need in the art for a seat cushion body which can accommodate different zones which are formed from a fiber material, while mitigating the problems associated with stacked material layers. There is also a need in the art for a method which allows such a seat cushion body to be formed without requiring pre-formed sheets of perpendicular-laid nonwovens to be joined to each other.

These and other needs are addressed by a seat cushion body and a method of producing a seat cushion body as defined by the independent claims. The dependent claims define embodiments.

According to an embodiment, a seat cushion body formed from thermally crosslinked fiber material is provided. The fiber material includes fibers of at least two different types. The seat cushion body has a main load direction and comprises a resilient portion formed from the fibers. The seat cushion body has a fiber orientation along the main load direction. The seat cushion body comprises at least one further portion formed from the fibers, the at least one further portion being distinguished from the resilient portion with regard to at least one of fiber orientation or fiber density. The resilient portion and the at least one further portion are integrally formed from the cross-linked fiber material.

In the seat cushion body, the resilient portion having a fiber orientation directed along the main load direction, which is typically orthogonal to the major face of the seat cushion body, provides desired resiliency characteristics and a soft touch feeling. The weight required to attain a desired cushion characteristics may generally be reduced as compared to a PU foam. Further, good breathability and ventilation is obtained. The at least one further portion having a density different from a density of the resilient portion and/or a fiber orientation different from a fiber orientation of the resilient portion allows the seat cushion body to address the various requirements imposed on different portions of a seat cushion body, such as by providing adequate backing for a cover material at the surface of the seat cushion body. With the resilient portion and the at least one further portion being integrally formed from the fiber material, a seat cushion body is provided which is homogeneous in the sense that it does not have to be formed from separate material layers which are subsequently joined together. The drawbacks associated with such structures can thereby be mitigated.

In the resilient portion having the fiber orientation, the fibers have a preferential direction corresponding to the main load direction. Of course, not all fibers will be oriented along the main load direction in the resilient portion, due to statistical fluctuations, variations in fiber shapes and the presence of cross-linking fibers. However, the preferential direction of the fibers in the resilient portion corresponds to the main load direction. The term "density" is used herein to refer to the conventional mass density.

The at least one further portion may have a further fiber orientation different from the fiber orientation of the resilient portion. The further fiber orientation may be chosen based on the location at which the at least one further portion is provided on the seat cushion body. For illustration, for a further portion located at a surface of the seat cushion body, the further fiber orientation may be directed parallel to the surface. For a further portion located at one of the major faces of the seat cushion body, the further fiber orientation may be directed transverse to the main load direction. Thereby, the faces of the seat cushion body may be configured as an adequate backing for a cover material.

The seat cushion body may have a first major face and a second major face opposite to the first major face, the main load direction extending from the first major face to the second major face. The at least one further portion may be formed on at least one of the first major face or the second major face. Portions having a density and/or fiber orientation different from the one of the resilient portion may also be formed on both major faces. Thereby, a major face facing a seat occupant in use of the seat cushion body may be configured so as to provide adequate backing for a cover material, and the opposite major face may be configured to provide adequate stability for attaching the seat cushion body to structural members of a seat. The major faces may generally extend perpendicularly to the main load direction.

The resilient portion and the at least one further portion may be offset relative to each other. The seat cushion body may exhibit a gradual change in fiber orientation from the resilient portion to the at least one further portion. Alternatively or additionally, the seat cushion body may exhibit a gradual change in density from the resilient portion to the at least one further portion. These configurations allow the seat cushion body to be formed from loose fiber material in one baking process, which is advantageous in terms of energy costs. The gradual change in density or fiber orientation is beneficial both with regard to durability and with regard to comfort of the seat cushion body.

There may be at least one further portion distinguished from the resilient portion in terms of fiber orientation or density, which is offset relative to the resilient portion along the main load direction. Additionally or alternative, there may be at least one further portion formed from the fibers which is distinguished from the resilient portion in terms of fiber orientation or density, and which is offset relative to the resilient portion in a direction transverse to the main load direction. This allows the further portions to be positioned on the seat cushion body as required for backing a cover material, for attaching the seat cushion body to structural or other rigid members, or similar.

The seat cushion body may be formed such that fibers extend from the resilient portion into the at least one further portion. With the resilient portion and the at least one further portion being integrally formed from the fibers, there may be some fibers extending between zones of different fiber orientation and density, enhancing structural integrity of the seat cushion body.

The at least one further portion may include a functional portion formed from the fibers and having a density greater than the density of the resilient part. The functional portion may be formed by compressing the fiber material from which the seat cushion body is formed upon production of the seat cushion body. Thereby, functional portions that may be used for various purposes, such as lumbar support portions or attachment portions, may be integrally formed with the resilient portion. The functional portions may be formed by compression of the fiber material in specific zones of the seat cushion body.

The functional portion may be configured for attaching a seat cover to the seat cushion body. The function portion may also be configured for attaching a rigid member, such as a structural member of a seat in which the seat cushion body is to be used, an adjusting mechanisms or similar, to the seat cushion body.

The fiber material may include filling fibers and binding fibers. The filling fibers may have a linear mass density in between 10 and 100 dtex. The binding fibers may have a linear mass density in between 7 and 40 dtex.

The filling fibers may have a length of preferably at least 30 mm. Filling fiber lengths may be selected to be in the range from 12-70 mm.

The seat cushion body may be formed in a unitary structure from the fibers. The seat cushion body may in particular be formed by filling loose fiber material into a mold and supplying heat to the fiber material within the mold, so as to form the seat cushion body in a unitary structure which does not require separate layers of perpendicular-laid, thermally bonded nonwovens to be joined to one another.

A composition of the fiber material may vary as a function of location in the seat cushion body. The seat cushion body may include fibers having a higher rigidity in portions of the seat cushion body where a high stability is desired. Alternatively or additionally, local variations in stiffness of the seat cushion body may be attained by implementing variations in density or variations in fiber orientation.

According to another aspect, a seat is provided which includes the seat cushion body according to any one aspect or embodiment. The seat cushion body may be provided at a seating surface, at a backrest portion and/or at a headrest portion.

The seat may be a vehicle seat. The seat may be an automobile seat. The seat may be a train seat. The seat may be an aircraft seat.

The seat may be a seat for office or home use.

According to another embodiment, a method of producing a seat cushion body having a main load direction is provided. A loose fiber material including fibers of at least two different types is supplied into a three-dimensional mold. The mold has a cavity and defines a direction corresponding to the main load direction of the seat cushion body. The fibers include thermally activable binding fibers. The fibers are oriented such that, in at least a portion of the cavity, a fiber orientation is directed along the direction corresponding to the main load direction. Heat is supplied to the fibers filled into the mold to thermally activate the binding fibers.

Using the method, a unitary seat cushion body can be formed from the fiber material. As the method includes a step of orienting the fibers prior to supplying heat to the fibers, a seat cushion body may be formed in which, in at least one portion of the seat cushion body, the fibers have a preferential direction corresponding to the main load direction of the seat cushion body. Thereby, a desired soft feel touch and good breathability of the seat cushion body are attained.

The term "loose fiber material" as used herein refers to fiber material which is not in the form of a nonwoven or woven fabric. The loose fiber material may also include agglomerations of fibers, such as fiber flocks.

The mold may have two major faces on opposite sides of the cavity, which may be displaceable relative to each other. By displacing the major faces of the mold relative to each other, the orientation and density of the fiber material may be changed at the major faces of the mold. Thereby, the seat cushion body may be formed with portions which are distinguished with regard to density and/or fiber orientation from a resilient portion, in which the fibers have a preferential fiber orientation corresponding to the main load direction. Displacing the major faces of the mold relative to each other may also assist in orienting the fibers in a portion of the cavity where it is desired for the fibers to be oriented along the preferential direction which corresponds to the main load direction, so as to form the resilient portion of a seat cushion body.

The loose fiber material supplied into the mold may be compressed along a direction parallel to the main load direction prior to supplying the heat. Thereby, the portions distinguished from the resilient portion with regard to density and/or fiber orientation may be formed on the major faces of the seat cushion body. The main load direction of the formed seat cushion body may generally extend in a direction perpendicular to the major faces of the seat cushion body. In embodiments, the fiber material inserted into the mold may be compressed along two directions transverse to each other prior to supplying the heat.

Alternatively or additionally, the loose fiber material supplied into the mold may be compressed along a direction perpendicular to the main load direction prior to supplying the heat. Thereby, portions distinguished from the resilient portion with regard to density may be formed on lateral sides of the seat cushion body.

Additionally or alternatively to locally compressing the fiber material prior to thermal activation of the binding fibers, the fiber material or the seat cushion body formed therefrom may be locally compressed after thermal activation of the binding fibers. For illustration, portions of the seat cushion body may be compressed after thermal activation of the binding fibers and before the seat cushion body has been allowed to cool down to room temperature. By locally compressing portions of the seat cushion body subsequent to thermal activation of the binding fibers, for example during the cooling process of the seat cushion body, it is possible to reduce potential deviations of the seat cushion body shape from a desired final shape.

According to embodiments, the fibers may be oriented after insertion into the mold. The fibers may be oriented using gas flows, in particular air flows.

The loose fiber material may be supplied to the mold in a gas stream. A flow pattern of the gas stream may be controlled to orient the fibers within the mold. The flow pattern of the gas stream may be controlled based on a filling level of the fiber material in the mold. To this end, the mold may be provided with through openings for the gas stream.

To orient the fiber material after insertion into the mold, the location and/or size of an area or of areas at which gas is drawn from the mold may be adjusted based on the filling level. Gas may be drawn from the mold over major faces of the mold, which are spaced along the direction which corresponds to the main load direction. Gas may be drawn from the mold at areas of the major faces of the mold which are respectively disposed lower than a current filling level of the fiber material in the mold.

According to embodiments, the fibers may be oriented prior to insertion into the mold. The loose fibers may be deposited on a conveyor and may be oriented while being deposited on the conveyor. Orienting the fibers may be effected using a gas stream, such as an air stream. Other techniques for generating a parallel-laid fiber arrangement on the conveyor can be used. The oriented fibers may then be transferred from the conveyor into the mold such that the fiber orientation is directed along the direction which corresponds to the main load direction in the resulting seat cushion body.

Fibers may also be accumulated prior to insertion into the mold. A density profile may be automatically generated in the accumulated set of fibers, using pushers, gripper or other automatic tools. The accumulation of fibers with the density profile generated therein may be transferred into the mold. Thereby, zones having different densities or fiber orientations may be formed in the seat cushion body.

The fibers may be pre-heated to a temperature below the thermal activation temperature of the binding fibers prior to insertion into the mold. Thereby, the amount of thermal energy which has to be supplied to the fibers after insertion of the fibers into the mold may be decreased.

Heat may be supplied to the fibers in the mold using a stream of warm gas, air or water vapor.

Variations in a density of the fiber material in the mold may be effected by varying the amount of fiber material supplied into the mold as a function of position. Additionally or alternatively, variations in the density of the fiber material in the mold may be effected using a robot arm. Additionally or alternatively, variations in the density of the fiber material in the mold may be effected by controlling the flow pattern of gas streams, for example by adjusting a location or size of areas at which gas is drawn from the mold.

Variations in a density of the fiber material in the mold may also be effected by using a multi-stage compression procedure. Compression tools may be provided which have a shape corresponding to the high density portions of the seat cushion body.

A flow of heating medium used to supply heat to the fibers in the mold may be controlled, for example using a gas guiding system. The flow of the heating medium may be controlled so as to ensure that thermal activation of the binding fibers takes place throughout the seat cushion body. A cooling medium may also be supplied using the gas guiding system.

Rigid members, such as fastening members for a seat cover, may be inserted into the mold prior to supplying heat to the fibers. Fibers may be inserted into the mold such that the rigid members are embedded into the fibers. Rigid members, such as fastening members for a seat cover, may also be attached to the seat cushion body after thermal activation of the binding fibers. The seat cushion body may be locally heated to embed the rigid members into the seat cushion body. Portions for attaching a seat cover may also be formed from fiber material, by locally compressing the fiber material in pre-defined regions of the seat cushion body.

The fiber material may include the binding fibers and filling fibers. The binding fibers may be bi-component (BiCo) fibers. For illustration, the binding fibers may have a core and a coating. The core may be formed from polyester or polyamide. The coating may be formed from polyamide or modified polyesters. The binding fibers may have a trilobal shape in cross-section. The filling fibers may for example be formed from polyamide or polyester. The filling fibers have a melting temperature higher than the thermal activation temperature of the binding fibers. The filling fibers may be straight, helical, crimped, etc., and may be used to fill the volume of the seat cushion body.

An adhesive may be supplied into the form in a controlled manner, in order to selectively enhance the density of bonds between fibers in certain portions of the seat cushion body.

In the method, the fiber material may be supplied into the mold such that the composition of the supplied fiber material varies from one portion within the mold to another portion within the mold to adjust the properties, in particular the rigidity, of the seat cushion body in a spatially varying manner.

In the method, properties of the seat cushion body, in particular the rigidity, elasticity or damping behavior of the seat cushion body, may be controlled in a spatially varying manner. This can be attained by adjusting the composition, the density or the fiber orientation of the fiber material in a spatially varying manner.

In the method, a lumbar support portion may be formed in the seat cushion body. To this end, a zone of compressed fiber material may be formed on the B-face of the seat cushion body. The seat cushion body including the lumbar support portion may also be produced in a multi-stage process in which the lumbar support portion is formed first from a fiber material which is compressed prior to supplying thermal heat thereto. The softer portions of the seat cushion body may then be produced by supplying, in a second step, additional fiber material into the mold, orienting the additional fiber material, and supplying heat to the fiber material in the mold.

A process as described above in which a portion having a higher rigidity is formed in the seat cushion body may also be performed to provide attachment areas or receptacles for other rigid components. These attachment areas or receptacles may be used to attach components such as ventilators, compressors for pneumatic seat adjustment devices or electro-mechanical actuators to the seat cushion body.

The method may comprise removing the seat cushion body from the mold. While the seat cushion body is cooled down from the elevated temperature at which the binding fibers are thermally activated, the external shape of the seat cushion body may be adjusted using an auxiliary tool. The auxiliary tool may be a mold in which the formed seat cushion body is allowed to cool down, or is actively cooled down, while mechanical pressure is exerted onto the seat cushion body.

The auxiliary tool may be heated to smoothen and/or solidify the external surface of the seat cushion body. In order to fixate a desired shape, the auxiliary tool may be cooled down. The auxiliary tool may be an auxiliary mold used for calibrating the shape of the seat cushion body, smoothening its surface or solidifying its surface. A heated auxiliary tool may also be used to embed additional members into the formed seat cushion body or to selectively change the density of the fibers in certain portions of the seat cushion body.

A textile or fabric made of polyester may be applied to cover the seat cushion body. The textile or fabric may be applied to the seat cushion body after the seat cushion body has been removed from the mold. Alternatively, the textile or fabric made of polyester may be inserted into the mold prior to filling the fiber material into the mold.

The methods according to the various embodiments may be used to produce a seat cushion body according to an aspect or embodiment.

The seat cushion bodies according to various aspects and embodiments, and the methods for producing the same, may be used in various types of seats, including seats for automobiles, aircrafts and trains and seats for office or home seating.

Embodiments of the invention will be described with reference to the accompanying drawings.

Exemplary embodiments of the invention will now be described with reference to the drawings. While some embodiments will be described in the context of specific fields of application, the embodiments are not limited to this field of application. Further, the features of the various embodiments may be combined with each other unless specifically stated otherwise.

Figure 1:
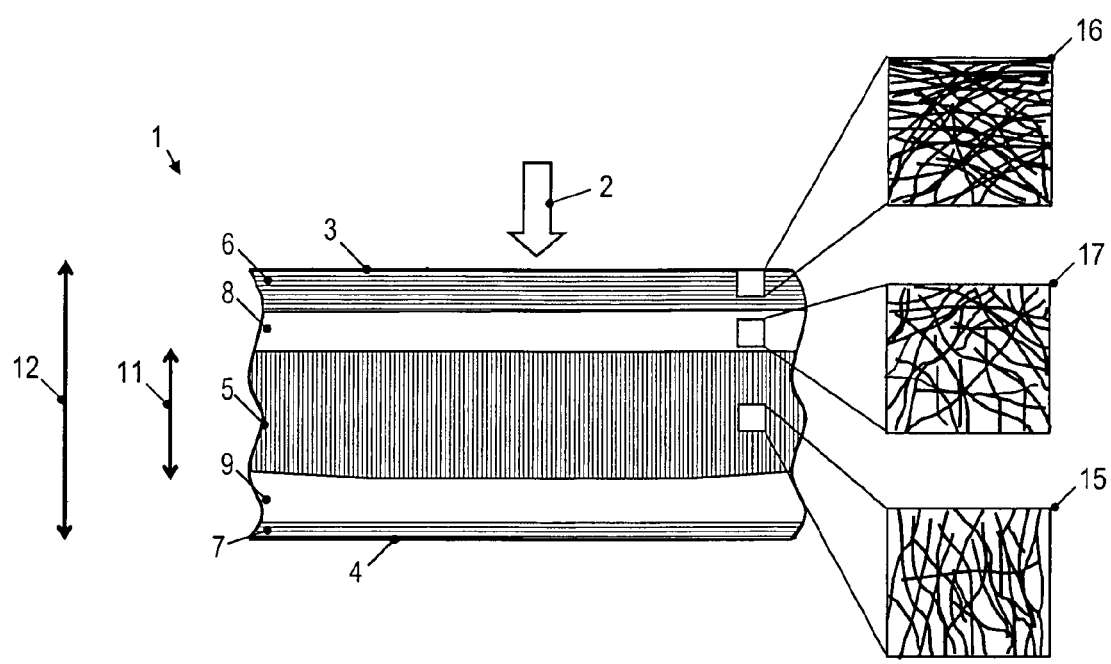
FIG. 1 is a schematic cross-sectional view of a seat cushion body of an embodiment.

FIG. 1 is a schematic cross-sectional view of a seat cushion body 1 according to an embodiment. The cross-sectional view of FIG. 1 is taken along a plane which is perpendicular to major faces of the seat cushion body 1 and parallel to a main load direction of the seat cushion body 1. The seat cushion body is configured to provide resilient characteristics when a force directed along a main load direction 2 is exerted onto the seat cushion body 1.

The seat cushion body 1 has two major faces 3, 4 which are arranged so as to be opposite to each other on the seat cushion body 1. The major faces 3, 4 may have an approximately planar shape, extending essentially perpendicularly to the main load direction 2. The seat cushion body 1 may be configured such that the main load direction 2 defines a normal to the plane of the major faces 3 and 4. Protrusions or recesses (not shown in FIG. 1) may be provided on the major faces to define attachment regions for structural or functional seat components.

The seat cushion body 1 is a unitary body which is integrally formed from thermally cross-linked fibers. The fiber material forming the seat cushion body may include at least two different types of fibers, namely a binding fiber and a filling fiber. The binding fiber is a fiber which can be thermally activated by supplying heat thereto. Upon thermal activation, at least a portion of each binding fiber melts, thereby causing a matrix of fibers to form. Various known fiber types may be used as binding and filling fibers. The fiber material from which the seat cushion body is formed may include fibers that can be obtained from recycling material and/or which can be recycled in an efficient manner. The binding fibers may be bi-component (BiCo) fibers. The binding fibers may have a thermal activation temperature which is lower than a melting temperature of the filling fibers. According to exemplary embodiments, the binding fibers may be BiCo fibers having a core of polyester or polyamide, and having a coating of polyamide or modified polyester. The BiCo fibers may have a trilobal shape in cross-section. The filling fibers may be formed from polyester or polyamide and have a melting temperature higher than at least the melting temperature of the coating of the binding fibers. The filling fibers may have a linear mass density of preferably in between 10 and 100 dtex. The binding fibers may have a preferred linear mass density of in between 7 and 40 dtex. The fiber material from which the seat cushion body is formed may include more than one type of filling fiber and/or more than one type of binding fiber.

The seat cushion body 1 includes a plurality of different portions 5-7. The portions are distinguished from each other with regard to a characteristic fiber orientation and/or a density of the seat cushion body 1. There are no sharp boundaries between the different portions. Rather, the seat cushion body 1 exhibits gradual transitions in fiber orientation or seat cushion body density between the different portions. The seat cushion body 1 is distinguished from bodies which are formed by fusing pre-formed perpendicular laid fiber sheets inter alia in that it does not include sharp zone boundaries, which enhances durability and comfort.

The seat cushion body 1 has a resilient portion 5. The resilient portion 5 has a fiber orientation corresponding to the main load direction 2 of the seat cushion body. I.e., the preferential direction of the fibers in the resilient portion corresponds to the main load direction 2 and is perpendicular to at least one major face 3 of the seat cushion body 1. Due to the formation of the fiber matrix, fiber shapes and statistical distributions in fiber orientation, not all fiber fibers will be directed along the main load direction 2 in the resilient portion. The resilient portion 5 may be considered to have a fiber orientation along the main load direction 2 if more than 50% of the fibers are respectively oriented at an angle of less than 45° to the main load direction 2. In other words, in the resilient portion 5, the majority of fibers is disposed at angle of more than 45° relative to the plane of the major face 3.

The fiber configuration in the resilient portion 5 is schematically indicated at the inset 15. As seen in the inset 15, a majority of the fibers in the resilient portion 5 may be oriented at an angle of less than 45° to the main load direction, and the fiber spacing may be sufficiently large so as to allow the fibers to deflect when a load is directed along the main load direction 2. Cross-linking fibers, which interconnect the fibers which are mainly disposed parallel to the main load direction 2, allow a fiber matrix to be formed in the resilient portion 5.

The seat cushion body 1 also includes further portions 6, 7 disposed at the major faces 3 and 4, respectively. The further portions 6 and 7, respectively, are distinguished from the resilient portion 5 with regard to at least one of fiber orientation or seat cushion body density. In the seat cushion body 1 of FIG. 1, the fibers in the further portions 6 and 7 respectively have a preferential direction parallel to the plane of the major face at which they are disposed. The density of the seat cushion body at the major faces 3 or 4 may be greater than a density in the resilient portion 5.

The fiber configuration in the further portion 6 disposed at the major face 3 is schematically indicated at the inset 16. As seen in the inset 16, a majority of the fibers in the face portion 6 may be oriented at an angle of less than 45° to the plane of the major face 3, and the fibers may have a packing density greater than in the resilient portion 5. The further portion 7 disposed on the other major face 4 may have a configuration, with regard to fiber orientation and seat cushion body density, which is similar to the one of the portion 6.

As has been indicated above, the seat cushion body 1 is formed in a unitary manner, and there are gradual transitions in fiber orientation and density between the resilient portion 5 and the further portions 6 and 7, respectively. The seat cushion body 1 includes a transition portion 8 which is disposed in between the resilient portion 5 and the further portion 6 on the major face 3. In the transition portion 8, the fiber orientation varies gradually from the fiber orientation of the resilient portion 5 to the fiber orientation of the further potion 6 on the major face 3, and the density of the cushion body varies gradually from the density of the resilient portion to the density of the further portion 6 on the major face 3. The fiber configuration in the resilient portion 8 is schematically indicated at the inset 17.

The seat cushion body 1 includes a transition portion 9 which is disposed in between the resilient portion 5 and the further portion 7 on the major face 4. In the transition portion 9, the fiber orientation varies gradually from the fiber orientation of the resilient portion 5 to the fiber orientation of the further potion 7 on the major face 4, and the density of the cushion body varies gradually from the density of the resilient portion 5 to the density of the further portion 7 on the major face 4.

The seat cushion body 1 is formed in a unitary manner from the fiber material which includes binding and filling fibers. While the seat cushion body 1 has portions distinguished from each other with regard to fiber orientation and/or seat cushion body density, the seat cushion body 1 is homogeneous in the sense that there are no sharp zone boundaries between portions of different fiber orientation and/or seat cushion body density. The seat cushion body 1 thus formed as a unitary body has a height 12 which may be greater than 4 cm. The resilient portion 5 having a height 11 may be disposed so as to be spaced from both major faces 3 and 4.

Fibers may extend between the different portions of the seat cushion body. For illustration, at least the filling fibers may have a length of preferably more than 30 mm. For further illustration, at least the filling fibers may have a length of preferably less than or equal to 60 mm. At least some of the fibers may extend from the resilient portion 5 into the further portion 6 on the major face 3 or into the further portion 7 on the major face 4.

In the seat cushion body 1, the resilient portion 5 having the fiber orientation along the main load direction 2 provides good ventilation and resiliency. With the seat cushion body 1 being formed in a unitary manner from thermally cross-linked fibers, good durability and comfort are attained.

Various modifications of the seat cushion body 1 can be implemented in other embodiments. For illustration, while portions 5-7 of different fiber orientation and density are illustrated in FIG. 1, there may be additional or alternative portions which are distinguished from the resilient portion 5 with regard to fiber density. While the further portions 6 and 7 on the major faces 3 and 4, respectively, are offset from the resilient portion 5 along the main load direction 2, further portions having a fiber orientation or density different from the one of the resilient portion 5 may also be offset from the resilient portion along a direction perpendicular to the main load direction 2. For illustration, further portions having a density greater than that of the resilient portion 5 may be provided on minor faces of the seat cushion body, which extend parallel to the main load direction 2.

Figure 2:
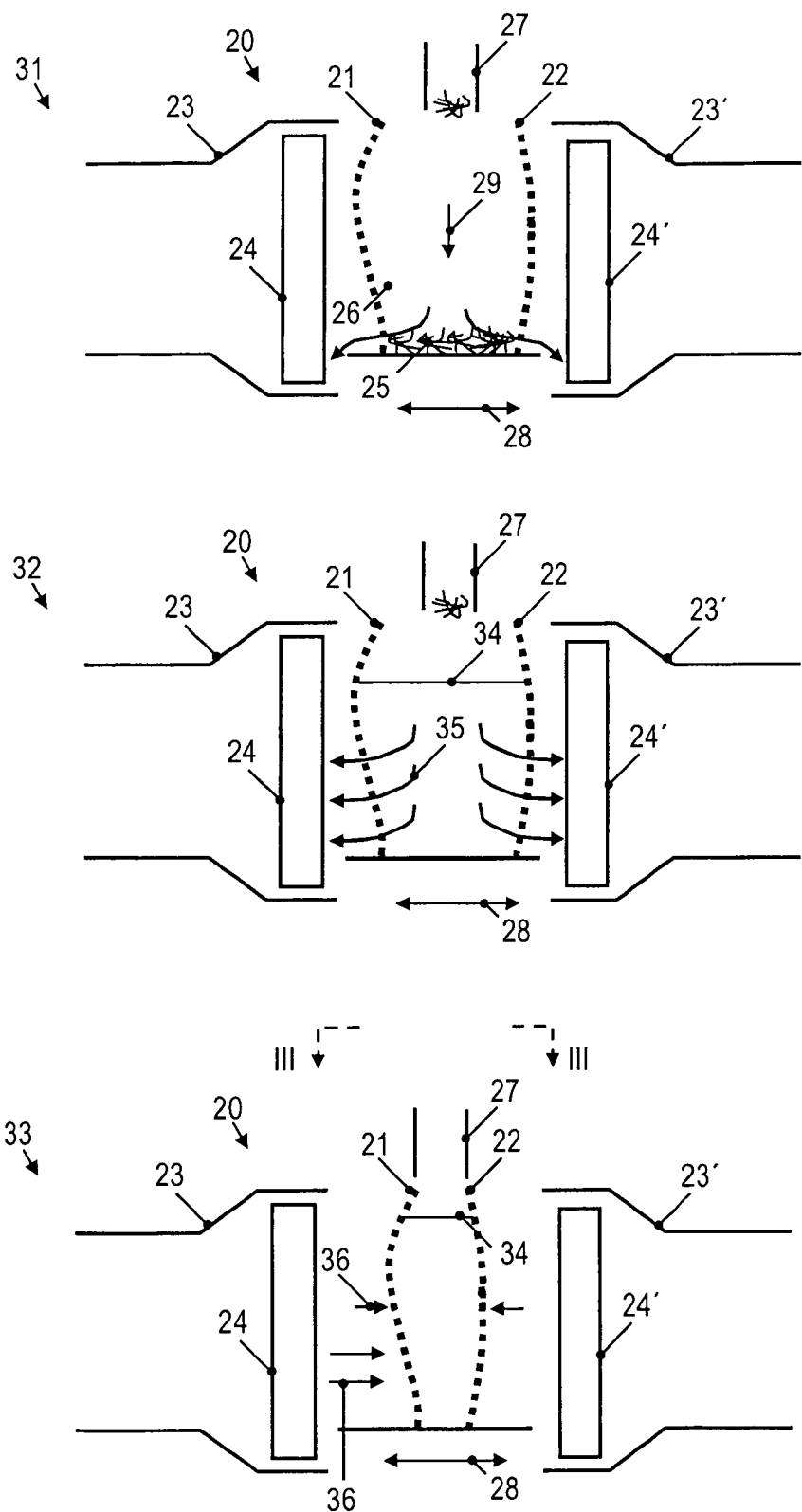
FIG. 2 is a schematic diagram for illustrating a method of producing a seat cushion body according to an embodiment.

FIG. 2 is a schematic representation for explaining a method of producing a seat cushion body according to an embodiment. The seat cushion body is formed as a unitary body from a thermally cross-linked fiber material. The method may be used to produce a seat cushion body according to an embodiment, for example the seat cushion body of FIG. 1. Various stages of the method are illustrated at 31, 32 and 33.

The method utilizes an apparatus 20 for producing the seat cushion body. The apparatus 20 includes a mold, which has a first mold 21 and a second mold 22. The first mold 21 and the second mold 22 may respectively be formed from a perforated material, e.g., from perforated metal sheets. The first mold 21 and second mold 22 may have a three-dimensional interior shape which corresponds to the shape of major faces of the seat cushion body. The apparatus 20 further includes gas guiding devices 23 and 23' for drawing gas from a volume defined by the first mold 21 and second mold 22. The gas guiding device 23 may include a controllable guiding assembly 24. The controllable guiding assembly 24 is configured such that gas may be selectively drawn into the gas guiding device 23 over various different areas of the guiding assembly 24. The location and size of the area at which gas is drawn from the volume 26 defined by the first mold 21 and the second mold 22 may be controlled via the guiding assembly 24. Similarly, the gas guiding device 23' may include a controllable guiding assembly 24'. The controllable guiding assembly 24' is configured such that gas may be selectively drawn into the gas guiding device 23' over various different areas of the guiding assembly 24'. The location and size of the area at which gas is drawn from the volume 26 defined by the first mold 21 and the second mold 22 into the gas guiding device 23' may be controlled via the guiding assembly 24'. The apparatus 20 also includes a supply device 27 for supply fiber material. The supply device 27 may include a tube, which may supply the fiber material entrained in a gas flow into the mold 21, 22. The mold formed by the first mold 21 and the second mold 22 defines a direction 28 along which the first and second moldy 21, 22 are spaced. The direction 28 corresponds to the main load direction of the seat cushion body which is formed using the method.

At 31, the first mold 21 and second mold 22 are disposed at a first distance. Loose fiber material, which includes binding fibers and filling fibers, is supplied into the mold 21, 22 via the supply device 27. The loose fiber material may be supplied in the form of fiber flocks. The fiber material is entrained in a gas stream 29, which is supplied to the mold 21, 22. When the fiber material is supplied into the mold 21, 22 so as to cover the mold bottom, gas may be drawn into the gas guiding devices 23 and 23' at locations which are generally disposed at the lower end of the molds 21, 22.

At a later stage illustrated at 32, fiber material has been filled into the mold up to a level 34. At this stage, fiber material may still be supplied into the mold 21, 22 via the supply device 27. The fiber material may be entrained in a gas stream supplied by the supply device 27. Gas may be drawn into the gas guiding devices 23 and 23' at locations which are generally disposed lower than the filling level 34 of the mold. As the filling level 34 rises, the location at which gas is drawn from the volume enclosed by the molds 21 and 22 may be controlled using the controllable guiding assemblies 24 and 24', respectively. For illustration, the guiding assemblies 24 and 24' may respectively include a plurality of flaps which are spaced from each other at least along the vertical direction, and flaps may be opened and closed in a controlled manner depending on the filling level 34. Using the controllable guiding assemblies 24 and 24', the flow pattern 35 of a gas stream may be controlled.

The gas stream 35 may be controlled such that the gas stream passing through the mold has a velocity component along the direction 28, which corresponds to the main load direction of the formed seat cushion body. The gas stream may be controlled such that, at least in a part of the volume 26 enclosed by the first and second molds 21, 22, the velocity component of the gas stream 35 parallel to the direction 28 is much greater than the velocity component which is perpendicular to the direction 28 and which extends parallel to the major faces (i.e., the velocity component which is perpendicular to the drawing plane in FIG. 2).

By controlling a flow pattern of the gas stream such that it passes through the fiber material deposited in the mold with a significant velocity component parallel to the direction 28, fibers may be oriented in the mold such that they have the direction 28 as a preferential direction.

At 33, fiber material has been filled into the mold up to a level 34, and no further fiber material is supplied. The first mold 21 and the second mold 22 are displaced relative to each other along the direction 28, as illustrated at 36. The first mold 21 and the second mold 22 may be displaced relative to a laboratory frame of reference. By displacing the first mold 21 and the second mold 22 relative to each other, portions of enhanced density may be formed within the volume 26 enclosed by the first and second molds 21, 22. Displacing the first mold 21 and the second mold 22 relative to each other may also assist in establishing a fiber orientation parallel to the inner surfaces of the first mold 21 and the second mold 22 in a region adjacent to the inner surfaces, and/or in establishing a fiber orientation parallel to the direction 28 in a portion of the volume 26 which is spaced from the inner surfaces of the first mold 21 and the second mold 22.

After the first mold and the second mold have been displaced relative to each other, so as to establish a desired profile in fiber orientations or in density within the fiber material disposed within the mold, heat may be supplied to the fiber material. By supplying heat, the binding fibers may be thermally activated. A fiber matrix of thermally cross-linked fibers may be formed by thermal activation of the binding fibers.

Heat for thermal activation of the binding fibers may be supplied in various ways. As illustrated at 33 in FIG. 2, a stream 36 of hot gas may be supplied into the mold. The gas guiding devices 23 and 23' may be used to direct the hot gas to portions of the fiber material disposed within the mold 21, 22 in a defined manner. The amount of hot gas supplied to various regions within the mold 21, 22 may be controlled based on, for example, the density or thickness of the seat cushion body in the respective regions.

The fiber material may be pre-heated to elevated temperatures, which are lower than the thermal activation energy of the binding fibers, when the fiber material is inserted into the mold. Thereby, the amount of energy required to thermally activate the binding fibers after the mold has been filled up to a desired level may be reduced.

The seat cushion body formed within the mold 21, 22 may be allowed to cool down. Another stream of gas, such as gas having room temperature or gas cooled to a temperature below room temperature, may be guided through the seat cushion body formed within the mold 21, 22.

It will be appreciated that only one heating process is sufficient to produce the three-dimensional seat cushion body from loose fiber material, when using the method illustrated in FIG. 2. This is in contrast to methods in which plural sheets of perpendicular laid fibers, produced by the Struto method, are stacked and bonded to each other. Generally, plural heating steps are required to produce the sheets of perpendicular laid fibers using the Struto method.

Additional processing steps may be performed in the method. For illustration, after forming the three-dimensional seat cushion body in the mold 21, 22, the seat cushion body may be inserted into an auxiliary mold to provide the seat cushion body with its final exterior shape, or to further solidify or smoothen its exterior surface. The seat cushion body may be inserted into the auxiliary mold while it is still at elevated temperatures or the auxiliary mold may be heated.

Functional elements may be inserted into the mold 21, 22 prior to, or in parallel with, filling the mold 21, 22 with the fiber material. For illustration, attaching members for a seat cover may be removably attached to the first mold 21 or the second mold 22. The attaching members may be formed from a metal. The attaching members are covered by the fiber material when the fiber material is supplied into the mold and are embedded into the seat cushion body upon thermal activation of the binding fibers.

Portions having a density greater than a density of the resilient portion may be selectively formed by controlling the density of fiber material supplied into the mold as a function of supply position, by selectively compressing the fiber material supplied into the mold, or by post-processing. For illustration, a heated tool my be used to locally increase the density of the seat cushion body after it has been removed from the mold 21, 22. Thereby, a portion of the seat cushion body may be provided with a high density, so that a seat cover material can be fastened on the seat cushion body at the high density portion.

Figure 3:
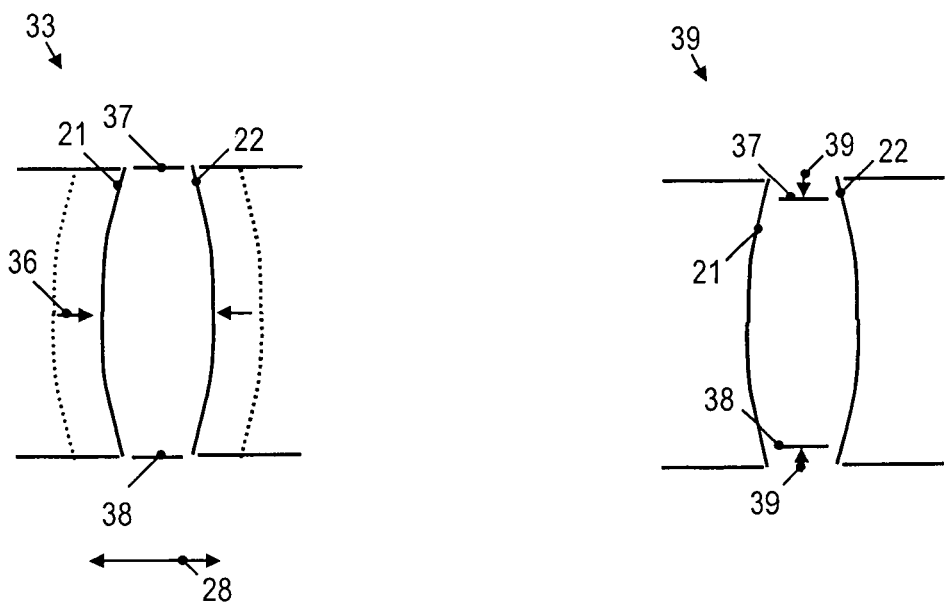
FIG. 3 is another schematic diagram for illustrating a variant of the method of FIG. 3 according to an embodiment.

FIG. 3 shows a top view of the mold having the first mold 21 and the second mold 22 of FIG. 2. The top view is taken along the direction indicated at line III-III in FIG. 2.

As illustrated in FIG. 3, the fiber material supplied into the mold may be compressed not only in one direction, but rather along several directions. As shown at 33, the first mold 21 and the second mold 22 may be displaced relative to each other in order to produce regions having a higher density in the fiber material, the higher density regions being disposed along the inner surfaces of the first mold 21 and the second mold 22.

Subsequently, the fiber material which has been inserted into the mold may be compressed on minor lateral faces of the seat cushion body. To this end, moveable portions 37 and 38 may be displaced in a direction 39 perpendicular to the direction 28, which corresponds to the main load direction of the seat cushion body.

After the fiber material has been compressed in at least two directions, as illustrated in FIG. 3, heat may be supplied to the fiber material so as to cause thermal activation of the binding fibers.

According to further embodiments, the method may include compressing the fiber material inserted into the mold in at least three orthogonal directions prior to supplying heat to the fiber material.

Figure 4:
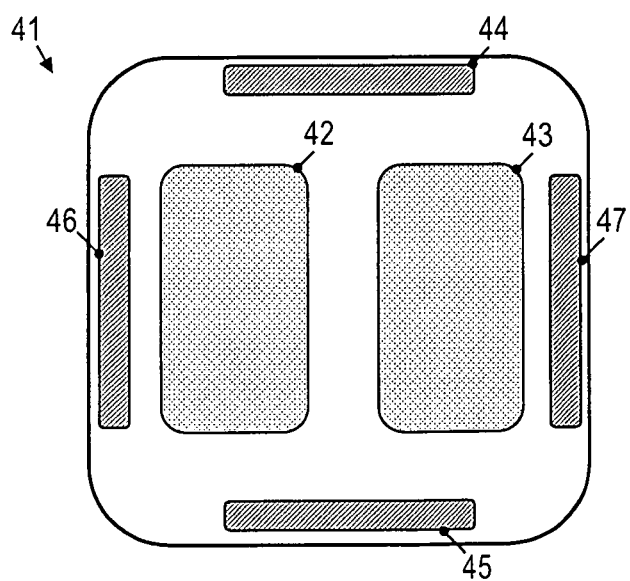
FIG. 4 is a schematic cross-sectional view of a seat cushion body of an embodiment.

FIG. 4 is a schematic cross-sectional view of a seat cushion body 41 according to another embodiment. The cross-sectional view is taken in a plane which is orthogonal to the main load direction of the seat cushion body 41. I.e., the main load direction of the seat cushion body 41 is perpendicular to the drawing plane of FIG. 4.

The seat cushion body 41 is formed as a unitary body from a fiber material which includes binding fibers and filling fibers. The fiber material may be selected as has been explained with reference to FIG. 1. The seat cushion body 41 may be formed using any one of the methods described herein, such as the method of FIG. 2.

The seat cushion body 41 includes two resilient portions 42 and 43 spaced from each other in a direction perpendicular to the main load direction. The two resilient portions 42 and 43 may be arranged such that, in use of the seat cushion body 41, each one of the resilient portions 42 and 43 supports a thigh. Each one of the two resilient portions 42 and 43 has a fiber orientation corresponding to the main load direction. I.e., in each one of the two resilient portions, the fibers have a preferential orientation which corresponds to the main load direction. For illustration, more than 50% of the fibers in the resilient portions 42 and 43 may be oriented at an angle of less than 45° relative to the main load direction.

The seat cushion body 41 includes further portions 44-47 which respectively have a fiber orientation and/or a density different from a fiber orientation and/or a density of the resilient portions 42 and 43. For illustration, the further portions 44-47 may be formed to have a density greater than a density of the resilient portions 42 and 43, respectively. The further portions 44-47 may be disposed to extend along lateral sides of the seat cushion body. The further portions 44-47 may be configured to have higher rigidity than the resilient portions 42 and 43, so that structural seat components or functional entities may be attached to the seat cushion body. Examples for functional entities include actuating elements, ventilation devices, components of a heating or cooling assembly or other components.

The seat cushion body 41 further includes transition portions disposed in between the resilient portions 42 and 43 and the further portions 44-47. In the transition portions, the density and/or fiber orientation varies gradually. There is a gradual transition in density and/or fiber orientation in the seat cushion body, without there being sharp zone boundaries associated with an abrupt change in fiber orientation and/or density. The seat cushion body 41 may be homogeneous in the sense that it does not have zone boundaries at which the fiber orientation and/or density changes discontinuously.

According to various embodiments, portions of the seat cushion body may be provided with a desired density profile so as to accommodate functional needs. For illustration, as has been explained with reference to the seat cushion body 1 of FIG. 1, a portion of the seat cushion body at a major face (A face) of the seat cushion body may be provided with a fiber orientation in which most fibers extend parallel to the face, so as to provide adequate backing for a seat cover material. Alternatively or additionally, lateral faces or the opposite major face (B face) of lateral side faces of the seat cushion body may be provided with a portion of fiber material having an increased density, so as to allow structural seat members or functional units to be attached to the seat cushion body.

Figure 5:
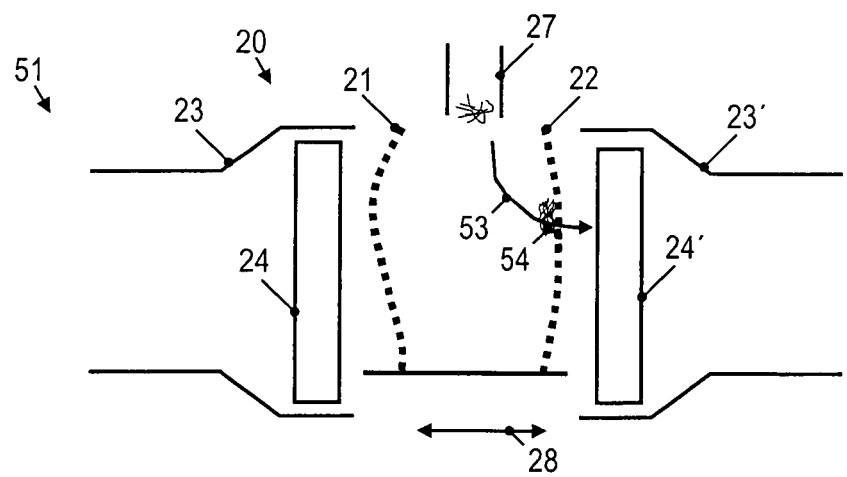
FIG. 5 is a schematic diagram for illustrating a method of producing a seat cushion body according to another embodiment.
Figure 5:
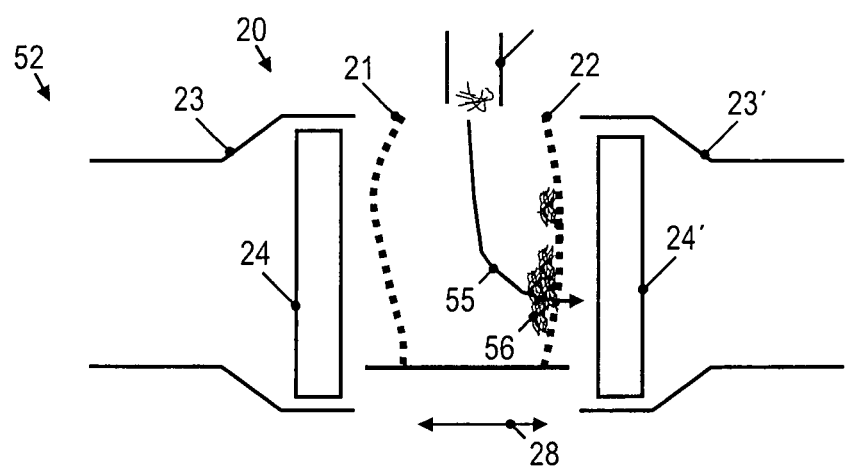

FIG. 5 is a schematic representation for explaining a method of producing a seat cushion body according to another embodiment. The seat cushion body is formed as a unitary body from a thermally cross-linked fiber material. The method may be used to produce a seat cushion body according to an embodiment, for example the seat cushion body 1 of FIG. 1 or the seat cushion body 41 of FIG. 4. Only initial stages of the method are illustrated at 51 and 52 in FIG. 5. The components of the apparatus 20 are operative as described with reference to FIG. 2.

At 51, fiber material is supplied into the mold in a gas stream. The gas may be drawn from the cavity 26 defined by the first mold 21 and the second mold 22. The gas stream may be drawn into the gas guiding device 23' at a location which is controlled using the controllable guiding assembly 24'. The flow of the gas stream 53 is directed such that the gas stream passes through the second mold 22 at a position spaced from the bottom of the second mold 22. Thereby, a local accumulation of fiber material 54 is effected. The inner surface of the second mold 22, in combination with the gas stream 53, assists in orienting the fibers in the local accumulation 54 so that the fibers are preferentially disposed parallel to the inner surface of the second mold 22. The process may be repeated for different locations on the inner surface of the first mold 21 and/or the second mold 22, so as to generate a pattern of regions having a desired density along the inner faces of the first and second molds 21, 22. Thereby, the seat cushion body may be provided with high density regions on its exterior.

At 52, fiber material is supplied into the mold in a gas stream. The gas stream may be drawn into the gas guiding device 23' at a location which is controlled using the controllable guiding assembly 24' and which is offset from the location at which gas had previously been drawn from the mold in stage 51. Thereby, a local accumulation of fiber material 56 is effected. The inner surface of the second mold 22, in combination with the gas stream 55, assists in orienting the fibers in the local accumulation 56 so that the fibers are preferentially disposed parallel to the inner surface of the second mold 22.

The fibers accumulated at 54 and 56 may be kept in position using an adhesive material, or by heating the fiber material so as to thermally activate the fibers in the accumulation 54 and/or the accumulation 56.

After portions of desired density and/or fiber orientation have been formed as described with reference to FIG. 5, the method may continue as described with reference to FIG. 3. Additional fiber material may be supplied into the mold. The fibers may be oriented. Gas may be drawn from the cavity defined by the first mold and the second mold at a location which is disposed lower than a current filling level of the fiber material in the mold in this process. Heat may be supplied to the fiber material, so as to thermally activate the binding fibers. A fiber matrix of thermally cross-linked fibers is thus formed. The resulting three-dimensional seat cushion body is formed as a unitary body from the fiber material.

While seat cushion bodies according to various embodiments have been described, various modifications may be implemented in other embodiments. For illustration, while integrally formed seat cushion bodies have been described which include a resilient portion and at least one further portion distinguished from the resilient portion with regard to fiber orientation and/or mass density, the at least one further portion may be distinguished from the resilient portion also with regard to the composition of the fiber material from which it is formed. The seat cushion body according to such an embodiment may exhibit a profile in composition of the fiber material from which it is formed. The profile in the composition of the fiber material may be selected such that portions having an increased rigidity, as compared to the resilient portion, may be formed at desired locations.

For further illustration, additional materials may be supplied into the mold prior to thermal activation of the binding fibers. In exemplary embodiments, adhesive material may be selectively supplied into the mold, so that the adhesive material is concentrated at pre-defined locations within the cavity defined by mold. The adhesive material may be selectively supplied to locally enhance the density of bonds between fibers.

While seat cushion bodies have been described which allow structural seat components or other functional components to be attached to the seat cushion body, the seat cushion body may also be formed such that support or comfort functions which are normally implemented with the aid of separate components may be integrated into the seat cushion body itself. For illustration, a lumbar support portion having an increased density may be formed.

While methods of producing a seat cushion body have been described in which the fibers are oriented after insertion into the mold, fibers oriented along a preferential direction may also be formed prior to inserting the fibers into the mold. The oriented fibers may be formed as parallel laid fibers on a conveyor. The fibers may be automatically transferred into the mold. The fibers may be inserted into the mold such that their preferential direction corresponds to the main load direction of the seat cushion body formed within the mold. I.e., the fibers may be transferred such that their preferential direction is perpendicular to the major faces defined by the inner surfaces of the mold.

The seat cushion bodies according to embodiments may be integrated into a wide variety of seats. Exemplary seats in which the seat cushion bodies may be used include automobile seats, train seats, aircraft seats, seats for home use and seats for office use. The seat cushion bodies according to various embodiments may further be used on various components of the seat. For illustration, a seat cushion body may be used at a seat portion which receives a person's thighs, at a backrest portion supporting a person's back, or at a headrest portion or other component where cushioning is desired.

The invention claimed is:

1. A method of producing a seat cushion body, said seat cushion body having a main load direction, said method comprising:
   supplying a loose fiber material including fibers of at least two different types into a three-dimensional mold in a gas stream, said mold having a cavity and defining a direction corresponding to said main load direction of said seat cushion body, said fibers including thermally activable binding fibers;
   orienting said fibers such that, in at least a portion of said cavity, a fiber orientation is established which is directed along said direction corresponding to said main load direction; and
   supplying heat to said fibers filled into said mold to thermally activate said binding fibers, wherein a flow pattern of said gas stream is controlled to orient said fibers within said mold.

2. The method of claim 1, wherein said flow pattern of said gas stream is controlled based on a filling level of said fiber material in said mold.

3. A method of producing a seat cushion body, said seat cushion body having a main load direction, said method comprising:
   supplying a loose fiber material including fibers of at least two different types into a three-dimensional mold, said mold having a cavity and defining a direction corresponding to said main load direction of said seat cushion body, said fibers including thermally activable binding fibers;
   orienting said fibers such that, in at least a portion of said cavity, a fiber orientation is established which is directed along said direction corresponding to said main load direction;
   supplying heat to said fibers filled into said mold to thermally activate said binding fibers; and
   compressing said loose fiber material supplied into said mold along said direction prior to supplying said heat and along a direction perpendicular to said direction prior to supplying said heat.

4. The method of claim 3, wherein said mold includes a first mold and a second mold enclosing said cavity, said method comprising effecting a relative displacement of said first mold and said second mold to compress said loose fiber material.

\* \* \* \* \*